United States Patent
Scherer, III et al.

(10) Patent No.: US 11,981,411 B1
(45) Date of Patent: *May 14, 2024

(54) MARINE DRIVES AND METHODS OF MAKING MARINE DRIVES SO AS TO MINIMIZE DELETERIOUS EFFECTS OF CAVITATION

(71) Applicant: Brunswick Corporation, Mettawa, IL (US)

(72) Inventors: John O. Scherer, III, Oshkosh, WI (US); Roger E. Koepsel, Oshkosh, WI (US); Andrew C. Gunderson, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/204,624

(22) Filed: Jun. 1, 2023

Related U.S. Application Data

(63) Continuation of application No. 17/880,860, filed on Aug. 4, 2022, now Pat. No. 11,713,102, which is a continuation of application No. 17/000,532, filed on Aug. 24, 2020, now Pat. No. 11,459,074.

(51) Int. Cl.
| | |
|---|---|
| *B63H 20/32* | (2006.01) |
| *B63H 1/18* | (2006.01) |
| *B63H 20/26* | (2006.01) |
| *B63H 1/14* | (2006.01) |

(52) U.S. Cl.
CPC .............. *B63H 20/32* (2013.01); *B63H 1/18* (2013.01); *B63H 20/26* (2013.01); *B63H 2001/145* (2013.01); *B63H 2020/323* (2013.01)

(58) Field of Classification Search
CPC .......... B63H 20/32; B63H 1/18; B63H 20/26; B63H 2001/145; B63H 2020/323; B63H 20/006; B63H 5/10; B63H 2005/103; B63H 2005/106; B63H 2020/006
See application file for complete search history.

(56) References Cited

U.S. PATENT DOCUMENTS

| | | | |
|---|---|---|---|
| 4,636,175 | A | 1/1987 | Frazzell et al. |
| 4,781,632 | A | 11/1988 | Litjens et al. |
| 4,792,313 | A | 12/1988 | Meisenburg |
| 4,898,553 | A | 2/1990 | Bankstahl |
| 5,009,621 | A | 4/1991 | Bankstahl et al. |

(Continued)

*Primary Examiner* — Andrew Polay
(74) *Attorney, Agent, or Firm* — Andrus Intellectual Property Law, LLP

(57) ABSTRACT

A method is for making a marine drive for propelling a marine vessel in water. The method includes providing a gearcase; installing a propeller shaft assembly that extends forwardly from the gearcase; coupling front and rear propellers to the propeller shaft assembly, forwardly of the gearcase, such that rotation of the propeller shaft assembly causes rotation of the front and rear propellers, respectively, which thereby propels the marine vessel in the water; and reducing deleterious effects of cavitation on the gearcase by the combination of forming the gearcase with a wide trailing end portion, in particular to maintain pressure alongside the gearcase, and configuring the front and rear propellers so that the front propeller absorbs more torque/thrust load than the rear propeller during said rotation.

14 Claims, 8 Drawing Sheets

(56) References Cited

U.S. PATENT DOCUMENTS

| | | | |
|---|---|---|---|
| 5,916,003 | A | 6/1999 | Masini et al. |
| 5,954,554 | A | 9/1999 | Bates |
| 5,967,866 | A | 10/1999 | Willows et al. |
| 6,059,618 | A | 5/2000 | Purnell et al. |
| 8,545,280 | B1 | 10/2013 | Patil et al. |
| 9,359,059 | B1 | 6/2016 | Scherer, III et al. |
| 9,932,099 | B1 | 4/2018 | Tuchscherer et al. |
| 10,011,341 | B1 | 7/2018 | Tuchscherer et al. |
| 11,459,074 | B1 * | 10/2022 | Scherer, III ............ B63H 20/32 |
| 2007/0098559 | A1 | 5/2007 | Hedlund et al. |
| 2011/0315063 | A1 | 12/2011 | Templeman et al. |
| 2016/0090162 | A1 | 3/2016 | Hasl et al. |
| 2016/0090164 | A1 * | 3/2016 | Hasl ...................... B63H 5/125 |
| | | | 416/85 |

* cited by examiner

MARINE DRIVES AND METHODS OF MAKING MARINE DRIVES SO AS TO MINIMIZE DELETERIOUS EFFECTS OF CAVITATION

CROSS-REFERENCE TO RELATED APPLICATIONS

The present application is a continuation of U.S. application Ser. No. 17/880,860, filed Aug. 4, 2022, which '860 application is a continuation of U.S. application Ser. No. 17/000,532, filed Aug. 24, 2020. Both of which applications are hereby incorporated by reference in entirety.

FIELD

The present disclosure relates to marine drives and methods of making marine drives, and more particularly to methods of making marine drives having one or more propellers located on a forward side of the lower gearcase in a forward-facing configuration, otherwise known as a tractor-type or a pulling-type configuration.

BACKGROUND

The following U.S. Patents are incorporated herein by reference:

U.S. Pat. No. 4,636,175 discloses water inlets formed on the sides of the gearcase of a marine propulsion unit. Ramps are formed in the gearcase ahead of the inlets to direct flow to the inlets. The ramp ahead of the upper ports has a greater depth to provide a substantial flow of water at positive pressure, while the ramp ahead of the lower ports has a lesser depth to avoid disturbances in flow when the unit is operated at high speeds where the upper inlets are normally above the resting surface of the water.

U.S. Pat. No. 4,781,632 discloses a marine drive provided with an anti-ventilation plate having a forward horizontal portion and an aft portion extending downwardly at an angle to horizontal and noncoplanar with the forward portion. An adjustable anti-ventilation plate is also provided. The preferred form of the adjustable anti-ventilation plate is particularly simple and readily added to existing structure.

U.S. Pat. No. 5,967,866 discloses a lower unit for a marine propulsion system has a flow disrupter positioned along the side wall of the vertical strut above the torpedo gearcase. The strut has a high-pressure side and low-pressure side which results from the strut being positioned at an angle with respect to the direction of boat travel in order to compensate for steering torque. The flow disrupter is positioned on the low-pressure side of the strut and promotes the separation of water passing over the vertical strut in a controlled manner, thereby reducing steering jerks during acceleration due to dramatic hydrodynamic flow changes. The flow disrupter consists of a series of steps or textured areas positioned along the aft section of the vertical strut.

U.S. Pat. No. 9,939,059 discloses an outboard marine engine having an anti-ventilation plate; a torpedo housing that is disposed below the anti-ventilation plate; and a gearcase strut that extends from the anti-ventilation plate to the torpedo housing. The gearcase strut has a leading end portion, a trailing end portion, and opposing outer surfaces that extend from the leading end portion to the trailing end portion. A flow separator is on each outer surface. The flow separator is located closer to the trailing end portion than the leading end portion and causes flow of water across the gearcase strut to separate from the outer surface.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

In examples disclosed herein, a method is for making a marine drive for propelling a marine vessel in water. The method includes providing a gearcase; installing a propeller shaft assembly that extends forwardly from the gearcase; coupling front and rear propellers to the propeller shaft assembly, forwardly of the gearcase, such that rotation of the propeller shaft assembly causes rotation of the front and rear propellers, respectively, which thereby propels the marine vessel in the water; and reducing deleterious effects of cavitation on the gearcase by, in combination, forming the gearcase with a wide trailing end portion, in particular to maintain pressure alongside the gearcase, and configuring the front and rear propellers so that the front propeller absorbs more torque/thrust load than the rear propeller during said rotation.

In examples disclosed herein, a marine drive is provided that has a gearcase having a strut; a propeller shaft assembly that extends forwardly from the gearcase; and front and rear propellers on the propeller shaft assembly, forwardly of the gearcase, wherein rotation of the propeller shaft assembly causes rotation of the front and rear propellers, respectively, which thereby propels the marine vessel in the water. The strut is configured to maintain pressure alongside the gearcase. When viewed in a plane extending in the lateral and longitudinal directions, the strut has a leading end portion with a generally conical shape having a minimum width in the lateral direction, body portion having a maximum width in the lateral direction, and a wide trailing end portion having a truncated conical shape with a minimum width in the lateral direction that is greater than the minimum width of the leading end portion and equal to or less than the maximum width of the body portion. The front and rear propellers are also configured so that that the front propeller absorbs more torque/thrust load than the rear propeller during said rotation.

BRIEF DESCRIPTION OF THE DRAWINGS

The present disclosure is described with reference to the following Figures.

DETAILED DESCRIPTION

Figure 1:
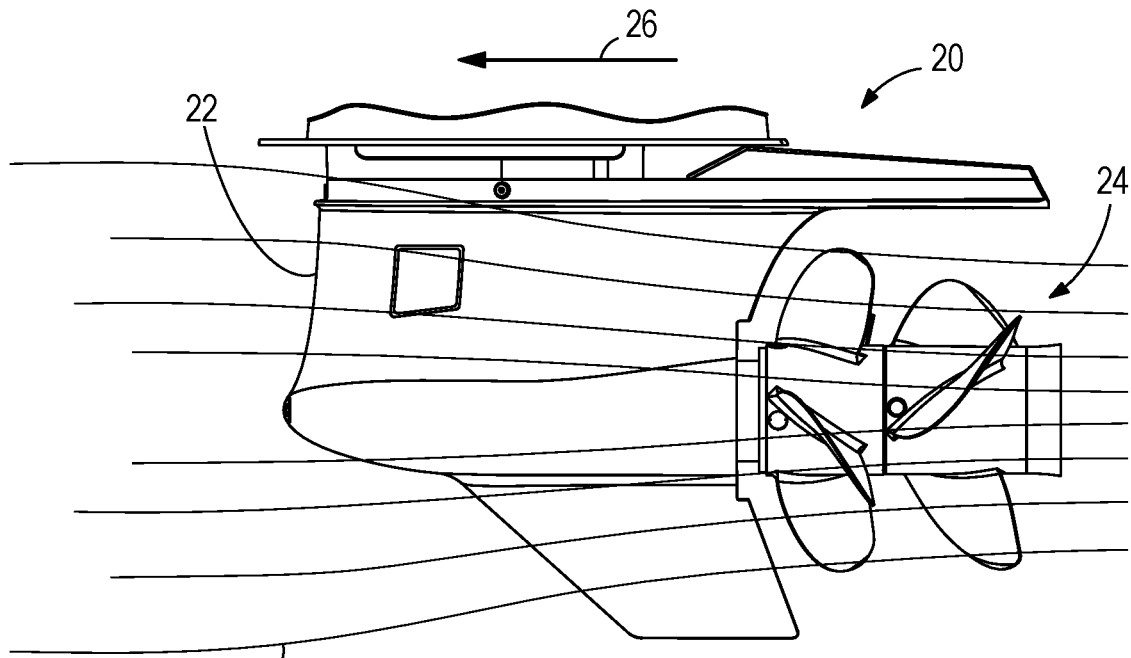
FIG. 1 illustrates a conventional rearward-facing stern drive, showing water flow there across during forward translation.

FIG. 1 illustrates a conventional rearward-facing stern drive 20 having a gearcase 22 and propellers 24 located on the rearward side of the lower gearcase 22 for propelling a marine vessel in a forward direction of travel 26. As shown, rotation of the propellers 24 during operation of the stern drive 20 produces a relatively mild velocity of water flow 28 over the gearcase 22.

Figure 2:
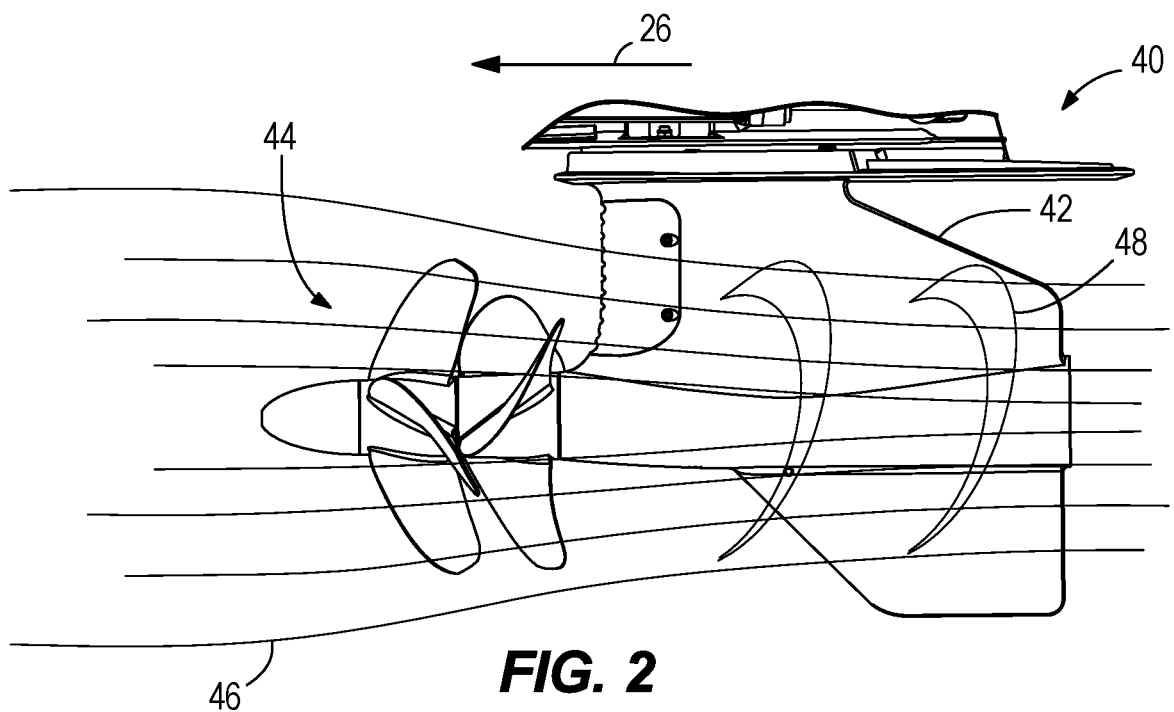
FIG. 2 illustrates a conventional forward-facing stern drive, illustrating water flow there across during forward translation.

FIG. 2 illustrates a conventional forward-facing stern drive 40 having a gearcase 42 and propellers 44 located on the forward side of the gearcase 42 for propelling a marine vessel in the forward direction of travel 26. As shown, rotation of the propellers 44 during operation of the stern drive 40 produces a relatively higher velocity of water flow 46 over the gearcase 42, as compared to FIG. 1 under the same conditions, combined with unsteadiness in the propeller blade wakes 48.

The present disclosure is a result of the present inventors' research and development in the field of marine drives, and particularly forward-facing marine drives (also referred to as tractor-type or pulling-type marine drives), such as shown in FIG. 2. The present inventors have determined that prior art forward-facing marine drives are particularly susceptible to deleterious effects of cavitation, which causes problems of various sorts. Cavitation erosion damage is one of the most severe. Acceleration of the water flow along the exterior of the gearcase can drop the local static pressure below vapor pressure and create cavitation bubbles. If these bubbles collapse downstream against the surface of the gearcase they can erode material and cause damage. Forward-facing stern drives are particularly susceptible to this problem because both the gearcase and propellers accelerate the flow over the gearcase. The rear facing stern drives also accelerate the flow over the gearcase, to some degree, but do not generate the higher velocity of water flow and unsteadiness of the wake field produced by the forward-facing propellers, particularly when considering the flow in the vicinity of the gearcase.

Efforts have been made in the art to ameliorate the effects of such cavitation on forward-facing marine drives. These efforts include provision of replaceable panel(s) on the strut of the gearcase, particularly in the location where cavitation damage typically occurs. The replaceable panel(s) wear out over time and then can be replaced. It is also known in the art to coat the gearcase in a protective material, such as an epoxy elastomer and/or silicone polymer material which is resistant to the deleterious effects of cavitation. However, the present inventors found that these solutions disadvantageously increase cost and manufacturing complexity and potentially create long-term maintenance issues.

Accordingly, through research and development, the present inventors have sought to improve upon the prior art, and particularly to provide improved forward-facing marine drives that are less prone to the deleterious effects of cavitation. Through research and experimentation, the present inventors have discovered that it is indeed possible to configure a marine drive in a way that effectively suppresses cavitation and thus avoids the resulting damage. Briefly, as will be further explained herein below, this is possible by (1) configuring the marine drive with a wider gearcase, particularly along the trailing end of the strut, as compared to the prior art, to thereby maintain a higher local static pressure alongside the gearcase, ideally above the vapor pressure, in combination with (2) configuring the propellers to vary the amount of torque/thrust load that is borne by each of the propellers during rotation, particularly so that the front propeller (i.e. the propeller located further from the gearcase) absorbs more thrust/torque load than the rear propeller during rotation. This combination of features was found by the inventors to surprisingly and significantly reduce the intensity of the cavitation and resulting damage to the gearcase.

These and other concepts will be further described herein below with reference to the illustrated embodiment. Note that although the illustrated embodiment is a stern drive, the concepts of the present disclosure are applicable to other types of forward-facing marine drives, including outboard drives and pod drives.

Figure 3:
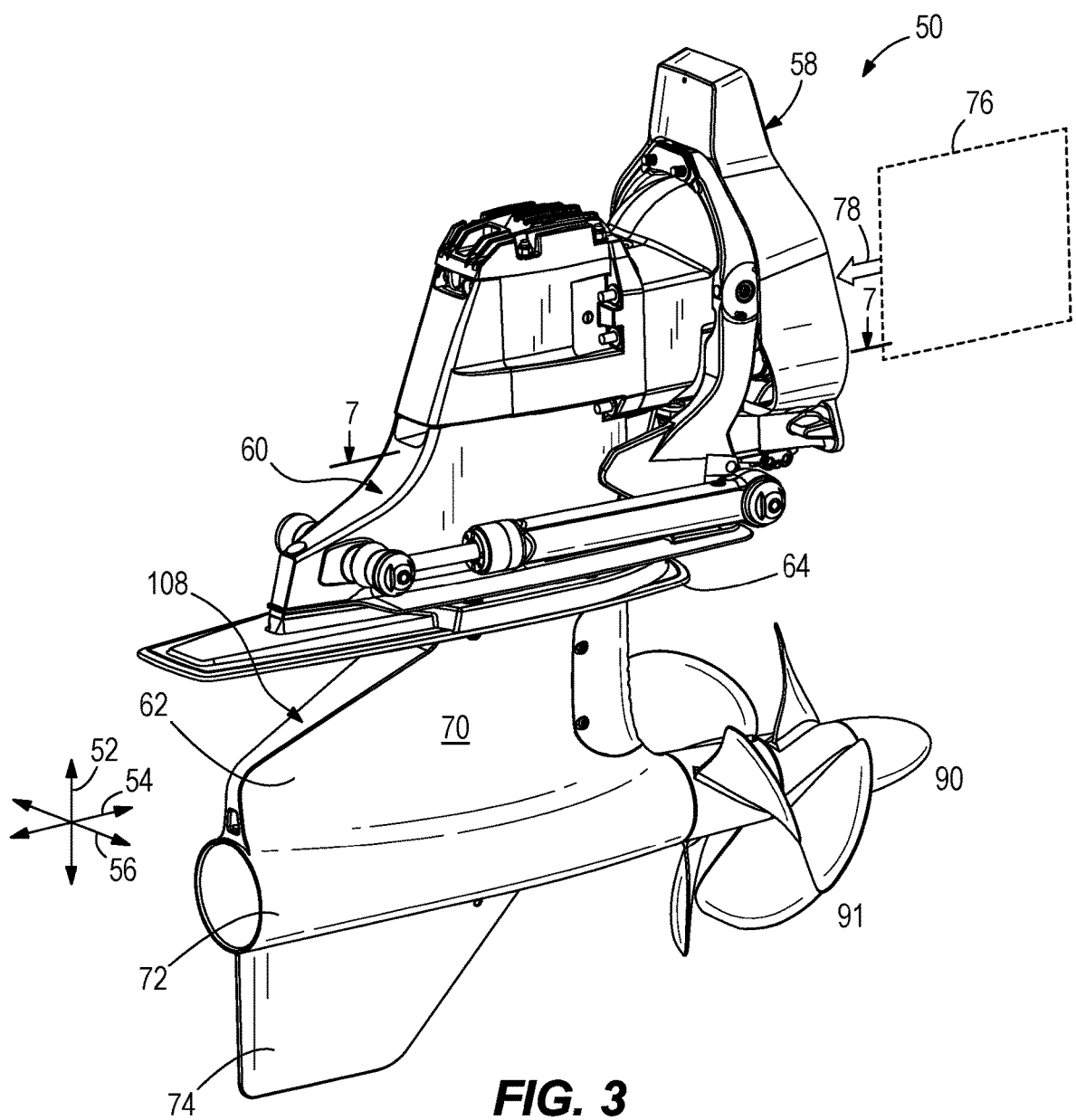
FIG. 3 is a starboard-side perspective view of a stern drive configured according to concepts of the present disclosure.
Figure 4:
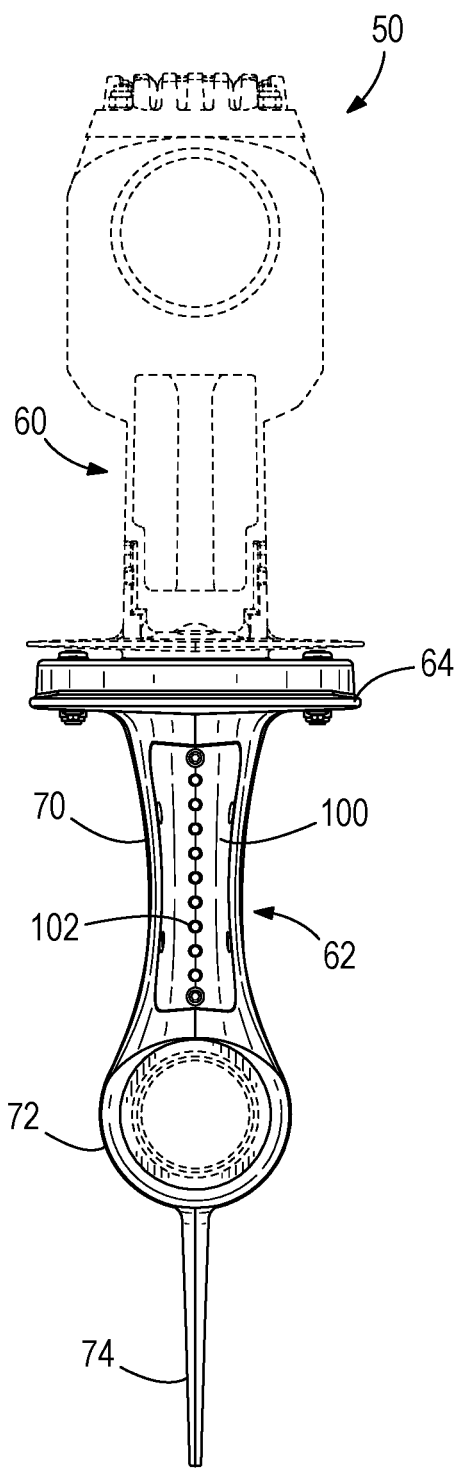
FIG. 4 is a front view of the marine drive in FIG. 3.
Figure 5:
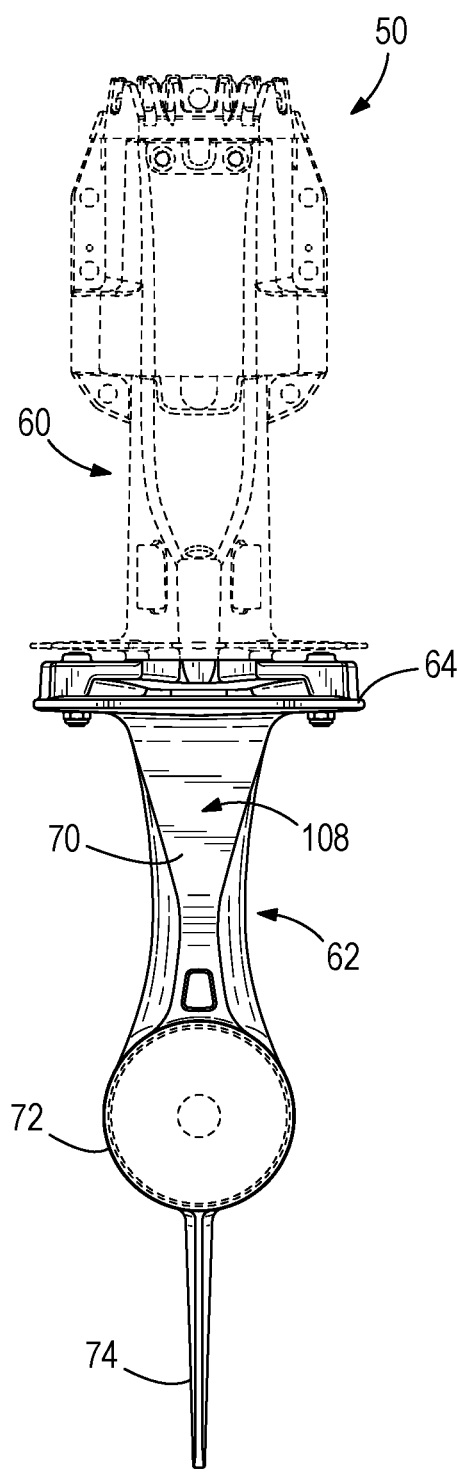
FIG. 5 is a rear view of the marine drive in FIG. 3.

FIGS. 3-5 depict a novel stern drive 50 which is configured according to inventive concepts of the present disclosure. The stern drive 50 extends from top to bottom in a vertical direction 52, from front to rear in a longitudinal direction 54 that is perpendicular to the vertical direction 52, and from port to starboard in a lateral direction 56 that is perpendicular to the vertical direction 52 and perpendicular to the longitudinal direction 54. The stern drive 50 has a transom bracket assembly 58 for attaching the stern drive 50 to a marine vessel. The stern drive 50 has a driveshaft housing 60, a lower gearcase 62 that depends from the driveshaft housing 60, and an adapter plate 64 between the driveshaft housing 60 and the gearcase 62. As conventional, the stern drive 50 is steerable to port and to starboard and trimmable up and down relative to the associated marine vessel.

Figure 6:
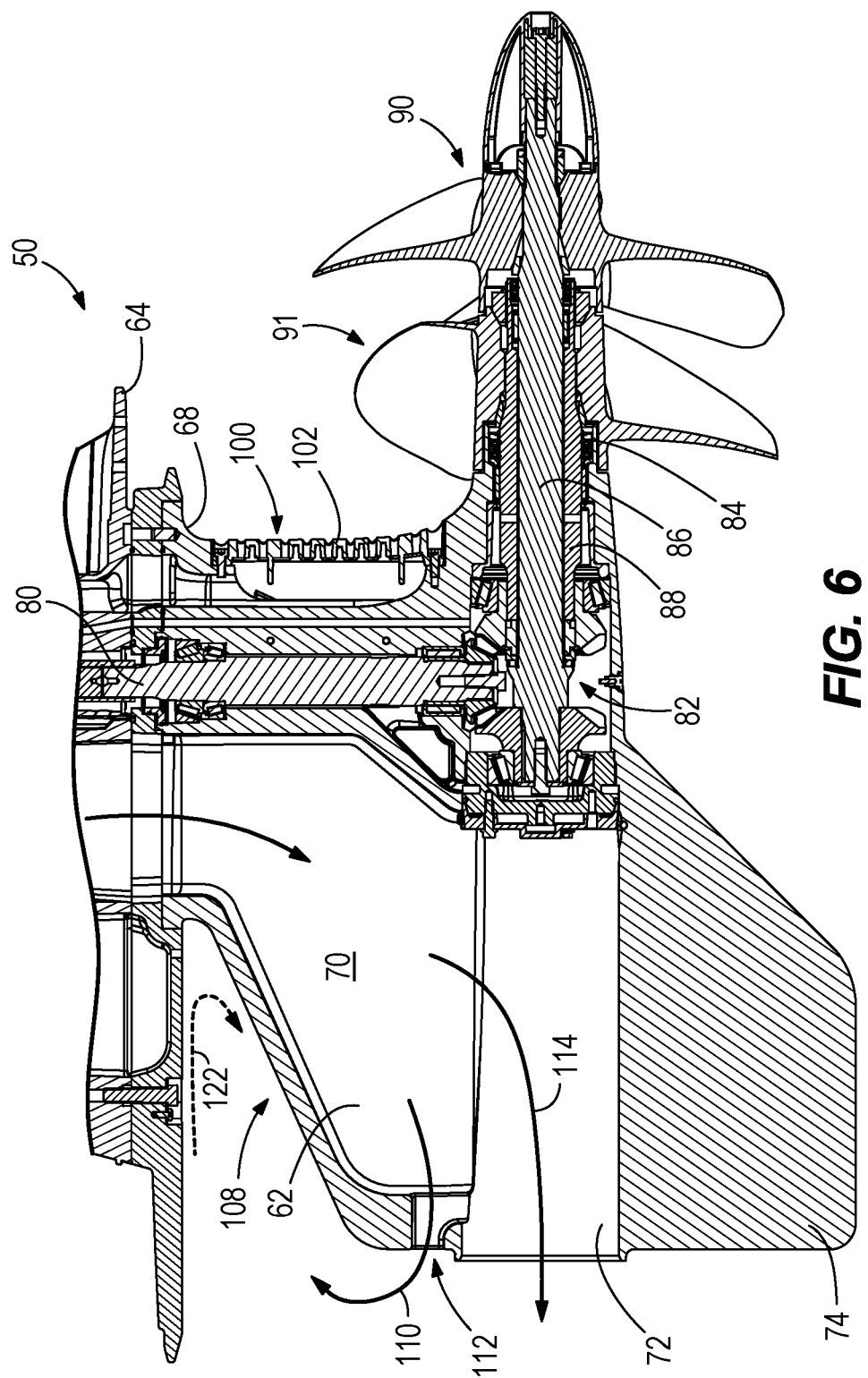
FIG. 6 is a sectional starboard side view of the stern drive, illustrating flow of air and exhaust gas during forward translation.

Referring to FIGS. 3 and 6, the gearcase 62 has an upper mounting pedestal 68 that is rigidly coupled to the bottom of the adapter plate 64. A strut 70 extends downwardly from the upper mounting pedestal 68 to a generally cylindrical-shaped torpedo housing 72. A skeg 74 extends downwardly from the torpedo housing 72. The stern drive 50 is powered by an engine 76, which for example can be an internal combustion engine located in the marine vessel. A driveshaft linkage has a generally longitudinal driveshaft portion 78 which extends from the engine 76 into the driveshaft housing 60 and a generally vertical driveshaft portion 80 which extends downwardly into the gearcase 62. As shown in FIG. 6, an angle gearset 82 operatively couples the vertical driveshaft portion 80 to a longitudinally-elongated propeller shaft assembly 84. In particular, the propeller shaft assembly 82 has coaxial counter-rotating propeller shafts 86, 88 that extend forwardly out of the gearcase 62. The propeller shaft assembly 84 is supported within the torpedo housing 72 via bearings so that the propeller shaft assembly 84 is rotatable about its own axis.

Figure 7:
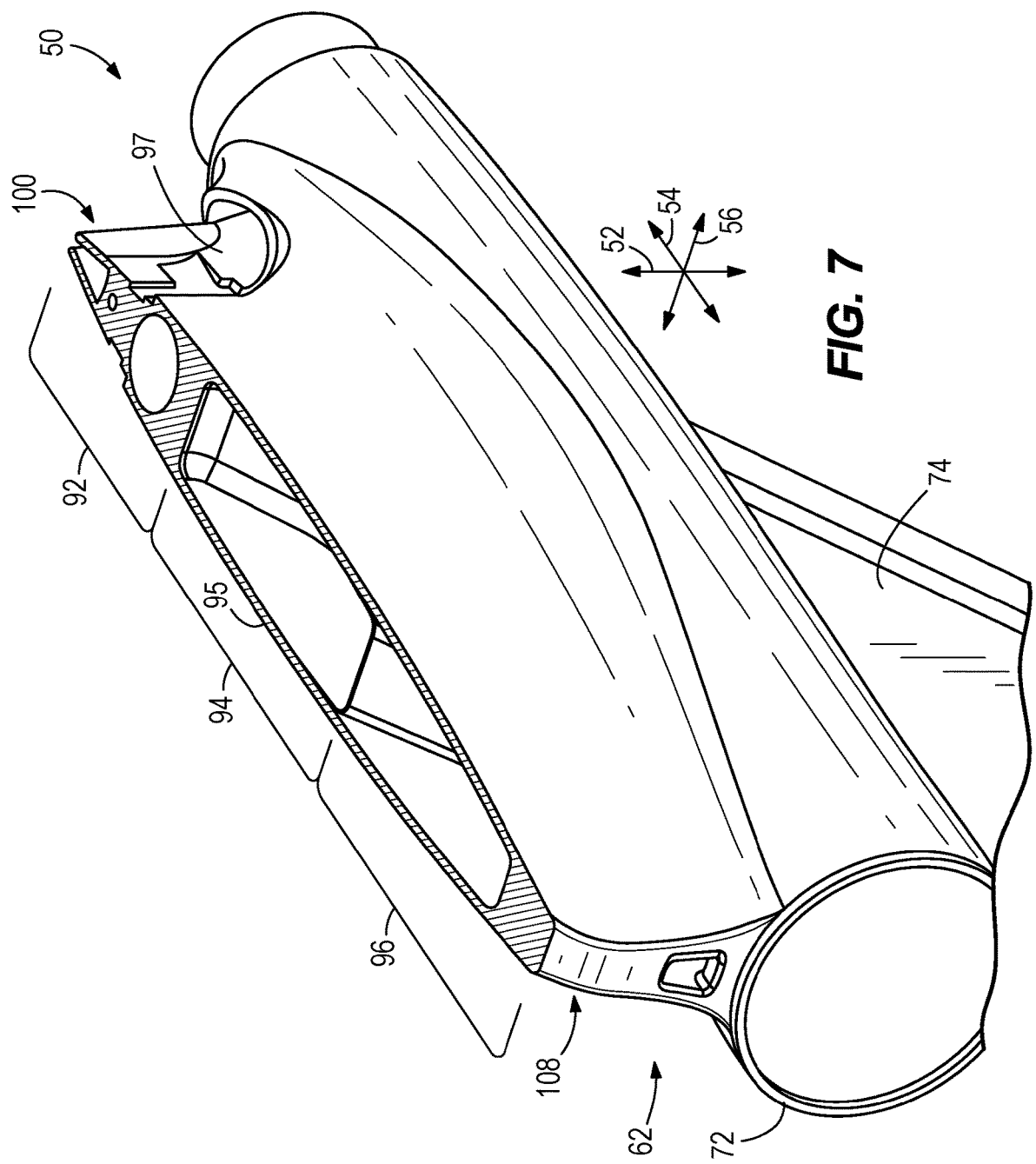
FIG. 7 is a view of section 7-7, taken in FIG. 3.

As will be understood by one having ordinary skill in the art, operation of the engine 76 causes rotation of the driveshaft linkage, which in turn causes counter-rotation of the propeller shafts 86, 88. Front and rear propellers 90, 91 are mounted on the respective propeller shafts 86, 88 such that rotation of the propeller shafts 86, 88 causes counter-rotation of the front and rear propellers 90, 91, which thereby propels the marine vessel in water. As conventional, the front and rear propellers 90, 91 each have propeller blades which absorb thrust/torque load from the surrounding water upon said counter-rotation. More specifically, each propeller 90, 91 is configured to carry a certain full throttle torque/thrust load at a selected design speed. As known in the art, propeller parameters, such as propeller pitch and/or propeller camber affect the amount of power absorption. The propeller parameters can be varied by the designer to achieve a desired torque/thrust loading, for each particular marine drive and marine vessel. The "torque load" is the loading placed on the propeller by the engine 76. The "thrust load" is the loading developed by the propeller as it rotates in the water, responsive to the torque load. These are separate amounts which are functionally related, and thus are often considered together. That is, the thrust load is a function of the torque load placed on the propeller, at a selected design speed. These values are characterized as "power absorption" of the counter-rotating propellers under full-throttle operating conditions for the marine drive and associated marine vessel. Prior art studies have shown that maximum efficiency of counter-rotating propellers is typically achieved by providing an even or nearly even front/rear torque/thrust load on the propellers Referring to FIGS. 3 and 7, the rear portions of the strut 70 are shaped wider than normal to purposefully maintain pressure across the surface of the gearcase 62 and thus reduce the occurrence of cavitation. FIG. 7 is a section view taken in a plane extending in the longitudinal and lateral directions 54, 56. As shown, the strut 70 has curved port and starboard sidewalls 95, 97. The strut 70 has a leading end portion 92, a middle or body portion 94, and a wide trailing end portion 96. In the section of FIG. 7, the leading end portion 92 has a generally conical shape with a minimum width in the lateral direction 56, which is located at the leading edge 100 of the conical shape. Water inlets 102 (see FIG. 4) at the leading edge 100 are configured to intake cooling water for cooling the engine 76. The strut 70 along the body portion 94 has a maximum width in the lateral direction 56. The wide trailing end portion 96 has a truncated conical shape. The strut 70 along the wide trailing end portion 96 has a minimum width in the lateral direction 56, which is greater than the minimum width of the leading end portion 92, and at least equal to or less than the maximum width of the body portion 94. The port and starboard sidewalls 95, 97 extend along the wide trailing end portion 96 and curve inwardly towards each other from the body portion 94 to a rearwardly-facing trailing end 108, which is generally planar and connects the port and starboard sidewalls.

During research and development, the present inventors determined that forming the strut 70 with the widened trailing end portion 96 (i.e. increasing the width of the trailing end portion 96 in the lateral direction compared to the prior art) advantageously maintains higher pressure along the surfaces of the gearcase 62 and thus reduces the occurrence of cavitation. It should be noted that the contours and thicknesses of the widened trailing end portion 96 can vary from what is shown. In certain preferred examples, the ratio of the minimum width to the maximum width is 0.2 to 1.0. In certain preferred examples, the ratio of the minimum width to maximum width is about 0.7. The above ratios are appropriate for a strut thickness-to-length ratio of about 0.15. The inventors found that strut sections having thicker proportions s will require a greater trailing end thickness fraction and strut sections having thinner proportions will require less trailing end thickness. The strut section profile shape is preferably designed to produce a smooth profile, according to conventional methods known by those having ordinary skill in the art.

Referring to FIG. 6, the inventors found it was counter-intuitive to widen the trailing end portion 96 in the manner described above because doing so increased drag forces on the gearcase 62 and thus negatively affected performance of the stern drive 50. However through research and development, the inventors overcame this countervailing factor by realizing it would be possible to reduce the drag by venting exhaust gases from the engine 76 via the trailing end 108 and by directing ambient air across the trailing end 108. More specifically, the gearcase 62 according to the present disclosure is specially configured to discharge a first portion 110 of the exhaust gases to the water via a vent opening 112 in the trailing end 108, above the torpedo housing 72. The remaining, second portion 114 of the exhaust gases is discharged to the water via the rear of the torpedo housing 72. The gearcase 62 is also specially configured to draw ambient air down alongside the trailing end 108 during forward translation, as shown via the arrow 122. In particular, the trailing end 108 has a generally vertical trailing end portion 116 which extends upwardly from the torpedo housing 72 to an angled trailing end portion 118 that angularly extends upwardly and forwardly to the upper mounting pedestal 68. The angled trailing end portion 118 defines a space or a gap 120 between the wide trailing end portion 96 and the adapter plate 64. This configuration causes ambient air to be drawn downwardly into the gap 120 and alongside the wide trailing end portion 96, as shown via arrow 122. The inventors found that the unique combination of these two sources of gas produces a gas pocket behind the strut 70 which is near atmospheric pressure (e.g., only slightly negative) compared to the very negative pressure (i.e., near vapor pressure) normally associated with cavitation at high speeds, thus significantly reducing the drag effects of the wide trailing end portion 96. This improvement permitted implementation of the wide trailing end portion 96 without a heavy drag penalty compared to a prior art gearcase having a relatively thinner trailing end portion.

The present inventors have also realized it would be possible to reduce the intensity of cavitation on the gearcase, and thus further limit the resulting damage on the gearcase 62 by configuring the front and rear propellers 90, 91 so that the front propeller 90 absorbs more torque/thrust load than the rear propeller 91 under steady state operating conditions. It is well known in the art to vary a propeller's configuration to adjust the torque/thrust load borne by a propeller. This is typically accomplished by, among other things, varying the blade pitch and/or blade camber of the propeller. As stated above, conventional methods teach equally splitting the torque/thrust loading between the two counter-rotating propellers 90, 91. It is also known to bias the torque/thrust loading towards one of the two propellers 90, 91. Such conventional methods are well known, examples of which are provided in B. D. Cox and A. M. Reed, Contrarotating Propellers—Design Theory and Application, The Society of Naval Architects and Marine Engineers, 1988, No. 15, Pages 15-1 through 15-23, duly submitted herewith and incorporated herein by reference. The present inventors applied these known concepts in a novel way to the present stern drive 50 having the wider trailing end portion 96 by specially configuring the propellers 90, 91 so that the front propeller 90 absorbs more thrust/torque load and thus generates a stronger tip vortex than the rear propeller 91 at full throttle speed under steady state operating condition, and particularly under high load as when wake surfing. This combination effectively shifted the stronger tip vortex forwardly, further away from the gearcase 62, and allows the rear propeller 91 to break up the concentrated vortical flow, thus surprisingly reducing the intensity of flow on the gearcase 62 and reducing cavitation damage. Note that making this change was counter-intuitive because it shifts the load more than would normally be desired for peak efficiency. In a non-limiting example, the present inventors specially configured the front and rear propellers 90, 91 so that the front propeller 90 absorbs about 52.5% of the torque/thrust load and the rear propeller 91 absorbs about 47.5% of the torque/thrust load at high speeds. At low speeds and high thrust conditions such as occur in wake surfing operations, more load shifts to the front propeller 90 and the split becomes about 55% front and 45% rear. This split is less balanced than normally desired for maximum gear durability and propeller efficiency but was discovered to be advantageous for reducing cavitation damage as described above.

Figure 8:
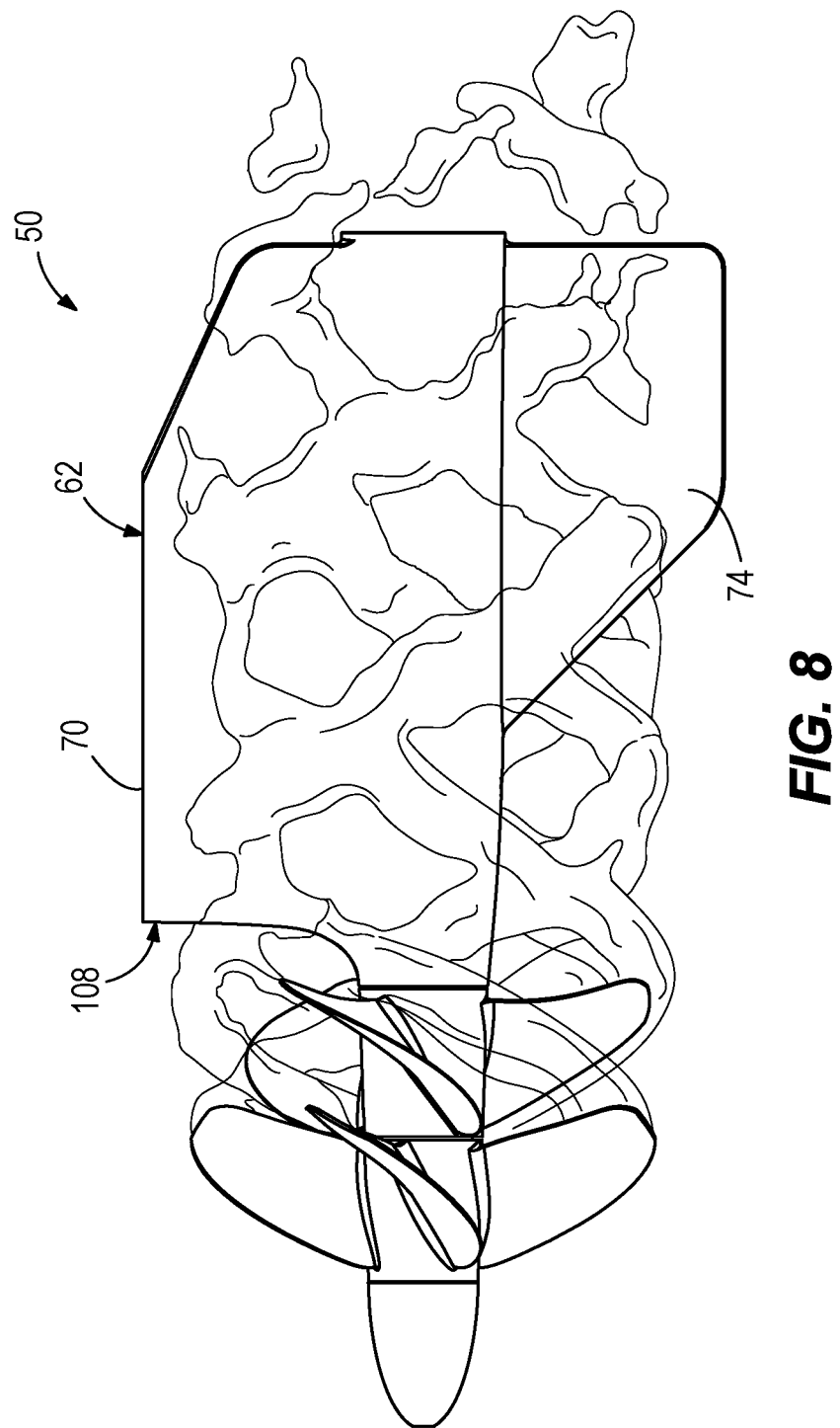
FIG. 8 is a port side view of the stern drive illustrating water flow there across during forward translation.

FIG. 8 is a computer-generated image illustrating propeller wash across the forward-facing stern drive 50. As shown, the propellers generate flow patterns across the gearcase 62, wherein the flow patterns have a tip vortex. The present inventors found that biasing the torque/thrust loading to the front propeller 90 advantageously reduces the intensity of cavitation on the gearcase 62.

Figure 9:
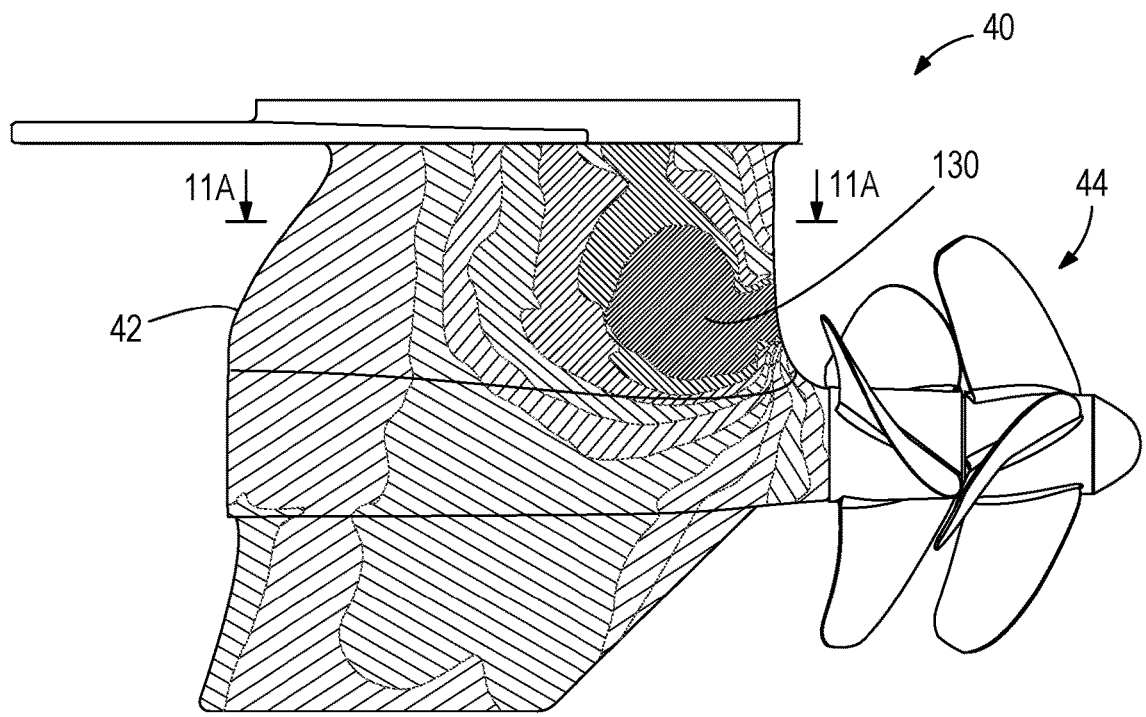
FIG. 9 illustrates results of a computational fluid dynamics analysis illustrating cavitation on a prior art stern drive during forward translation.

FIG. 9 illustrates results of a computational fluid dynamics analysis, showing cavitation 130 on a prior art stern drive during forward translation. By comparison FIG. 10 illustrates results of a computational fluid dynamics analysis for the stern drive 50 according to the present disclosure, wherein little or no cavitation occurred.

Figure 10:
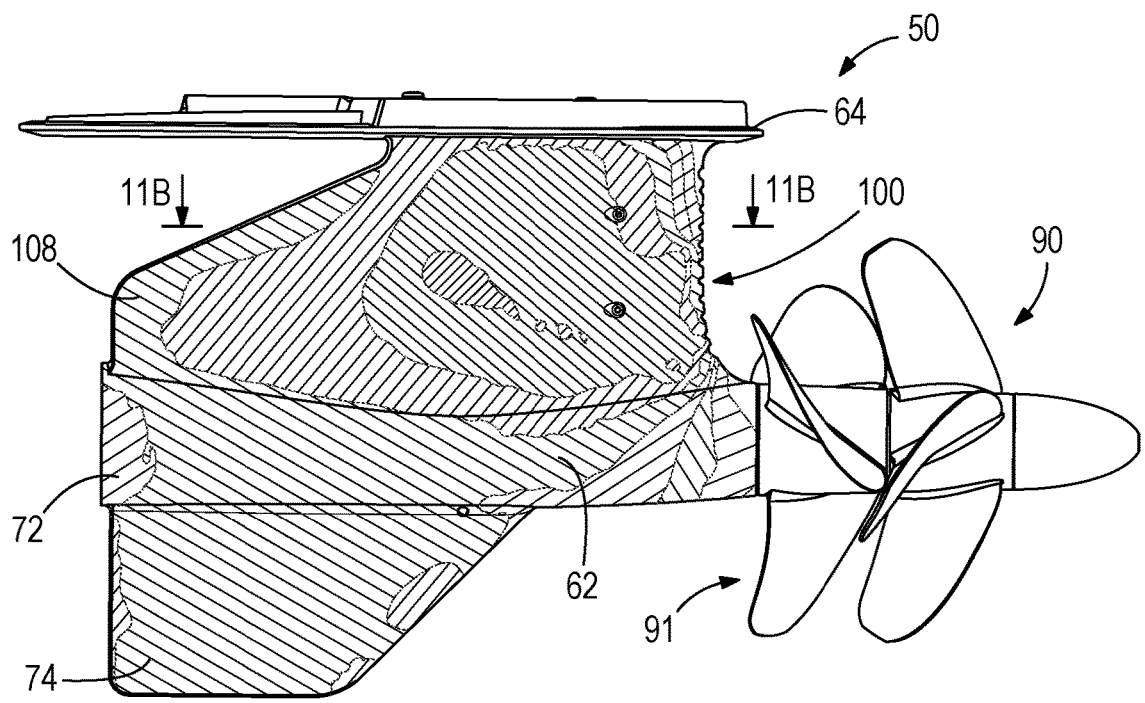
FIG. 10 illustrates results of a computational fluid dynamics analysis illustrating cavitation on the stern drive according to the present disclosure during forward translation.
Figure 11:
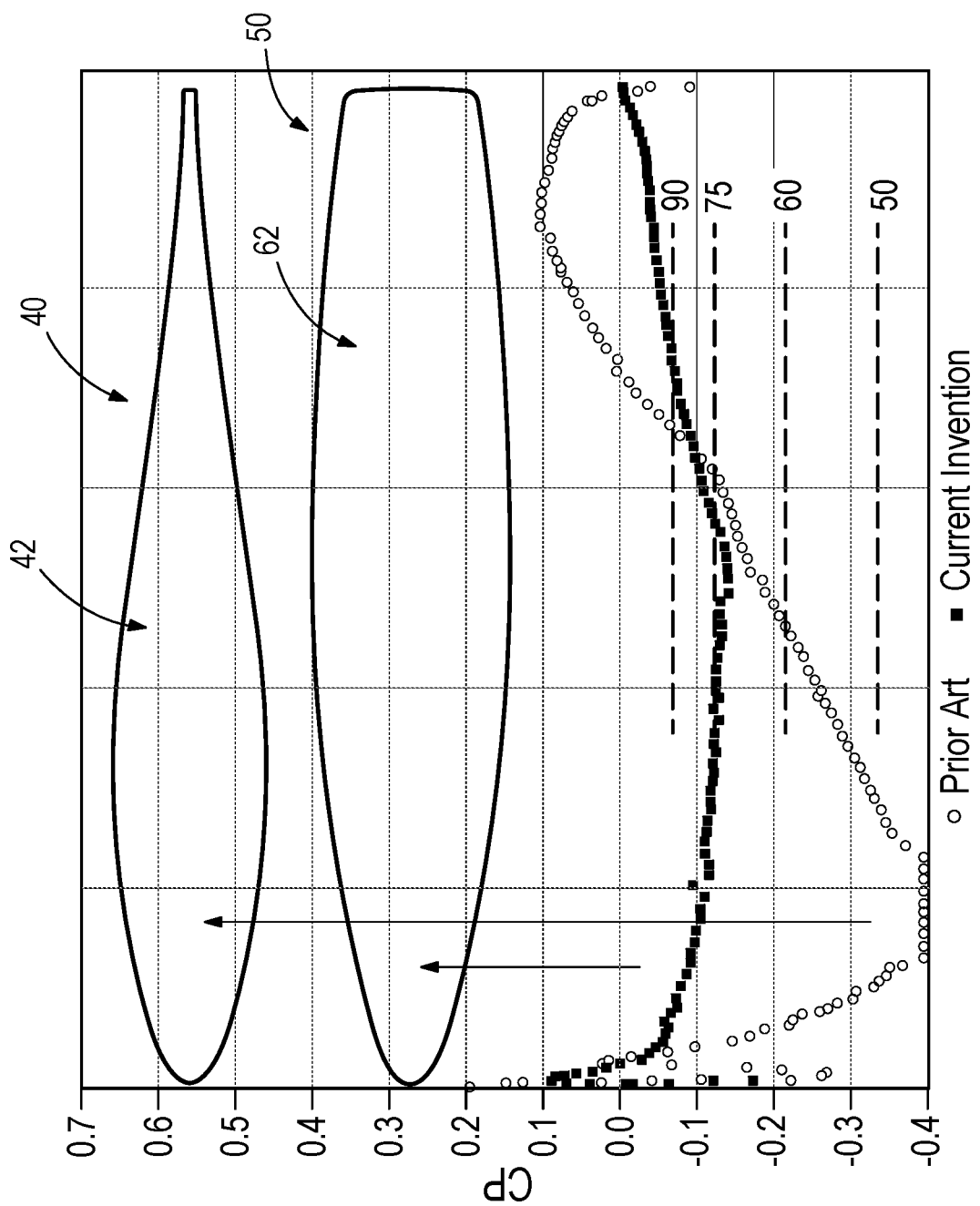
FIG. 11 is a graph illustrating pressure distributions along sections taken through the prior art stern drive shown at 11a-11a in FIG. 9 and through the stern drive according to the present disclosure shown at 11b-11b in FIG. 10.

FIG. 11 is a graph illustrating pressure distributions along a section of the conventional stern drive 40, particularly at 11a-11a in FIG. 9, and along a section of the stern drive 50, particularly at 11b-11b in FIG. 10. The pressure distributions are in coefficient form (Cp), calculated as follows:

$$Cp = \frac{p}{\frac{1}{2}\rho V^2}$$

wherein p is the local pressure on the gearcase, v is the free stream velocity of the stern drive in water, and $\rho$ is the density of water.

There is a velocity associated with each Cp for which p will equal the vapor pressure of water. When this happens, the flow will cavitate, which is what the present inventors sought to avoid. The horizonal dashed lines in FIG. 11 represent the cavitation speed for four different Cp values. Advantageously, the stern drive 50 configured according to the present disclosure raised the cavitation inception speed from 50 mph to almost 90 mph. This is a significant improvement, particularly when operating in the highly accelerated flow around the gearcase and in the presence of propeller wash that normally exists with a forward-facing drive. In preferred examples, the gearcase 62 and propellers 90, 91 are configured such that a water flow velocity at which cavitation occurs alongside the gearcase 62 is equal to or greater than 60 mph. In other preferred examples, the gearcase 62 and propellers 90, 91 are configured such that a water flow velocity at which cavitation occurs alongside the gearcase is equal to or greater than 70 mph. In other preferred examples, the gearcase 62 and propellers 90, 91 are configured such that a water flow velocity at which cavitation occurs alongside the gearcase is equal to or greater than 80 mph.

It will thus be seen that the present disclosure provides improved stern drives and methods of making stern drives that reduce or eliminate cavitation damage.

A surprising advantage of the presently described method is that widening the trailing end portion of the gearcase shifts the center of pressure of the stern drive rearwardly, which advantageously also provides improved steering stability. Center of pressure is defined as the location wherein the total sum of static pressure acts on the stern drive.

This written description uses examples to disclose the invention, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

As used herein, "about," "approximately," "substantially," and "significantly" will be understood by persons of ordinary skill in the art and will vary to some extent on the context in which they are used. If there are uses of these terms which are not clear to persons of ordinary skill in the art given the context in which they are used, "about" and "approximately" will mean plus or minus ≤10% of the particular term and "substantially" and "significantly" will mean plus or minus >10% of the particular term.

What is claimed is:

1. A method of making a marine drive for propelling a marine vessel in water, the marine drive extending from top to a bottom in a vertical direction, from a front to a rear in a longitudinal direction which is perpendicular to the vertical direction, and from a port side to a starboard side in a lateral direction which is perpendicular to the vertical direction and perpendicular to the longitudinal direction, the method comprising:

providing a gearcase having a strut;

providing front and rear propellers, located forwardly of the gearcase and configured such rotation of the front and rear propellers propels the marine vessel in the water; and reducing deleterious effects of cavitation on the gearcase by configuring the gearcase such that when viewed in a plane in the lateral direction and the longitudinal direction, the strut has a leading end portion having a minimum width from the port side to the starboard side in the lateral direction, a body portion with a maximum width from the port side to the starboard side in the lateral direction, and a trailing end portion having a minimum width in the lateral direction from the port side to the starboard side which is greater than said minimum width of the leading end portion and equal to or less than said maximum width of the body portion, wherein as result the marine drive is configured to maintain pressure alongside the gearcase during said rotation of the front and rear propellers and thus reduce said deleterious effects of cavitation.

2. The method according to claim 1, further comprising configuring the gearcase so that a ratio of the minimum width of the trailing end portion to the maximum width of the body portion is in a range of 0.2 to 1.0.

3. The method according to claim 1, further comprising providing an engine which emits exhaust gases, and further comprising discharging a first portion of the exhaust gases to the water via a vent opening in the trailing end portion, in particular to reduce drag that otherwise would be imparted to the marine drive via the trailing end portion.

4. The method according to claim 3, further comprising discharging a second portion of the exhaust gases to the water via a torpedo housing of the gearcase.

5. The method according to claim 3, further comprising providing an adapter plate above the gearcase, and forming the trailing end portion with an angled trailing end surface which defines a gap between the trailing end portion and the adapter plate, such that during forward translation of the marine drive, ambient air is drawn downwardly into the gap and alongside the trailing end portion, which thereby further reduces drag that otherwise would be imparted to the marine drive via the trailing end portion.

6. The method according to claim 1, further comprising selecting at least one of a blade pitch and a blade camber of at least one of the front propeller and the rear propeller so that the front propeller absorbs more torque/thrust load than the rear propeller.

7. The method according to claim 6, further comprising configuring the front and rear propellers so that the front propeller absorbs about 52.5% of the torque/thrust load and the rear propeller absorbs about 47.5% of the torque/thrust load.

8. The method according to claim 1, further comprising configuring the gearcase according to said method so that a water flow velocity at which cavitation occurs alongside the gearcase is equal to or greater than 60 mph.

9. The method according to claim 1, further comprising configuring the gearcase according to said method so that a water flow velocity at which cavitation occurs alongside the gearcase is equal to or greater than 70 mph.

10. The method according to claim 1, further comprising configuring the gearcase according to said method so that a water flow velocity at which cavitation occurs alongside the gearcase is equal to or greater than 80 mph.

11. The method according to claim 1, further comprising providing an engine that emits exhaust gases and configuring the gearcase to discharge a first portion of the exhaust gases to the water via the trailing end portion to thereby reduce drag that otherwise would be imparted to the marine drive via the trailing end portion and a second portion of the exhaust gases to the water via a torpedo housing of the gearcase.

12. The method according to claim 11, further comprising providing an adapter plate above the gearcase, and wherein the trailing end portion comprises an angled trailing end that defines a gap between the trailing end portion and the adapter plate, such that during forward translation of the marine drive, ambient air is drawn downwardly into the gap and alongside the trailing end portion, which thereby further reduces drag that otherwise would be imparted to the marine drive via the trailing end portion.

13. The method according to claim 11, wherein a ratio of the minimum width of the trailing end portion to the maximum width of the body portion is 0.2 to 1.0.

14. The method according to claim 11, wherein at least one of a blade pitch and a blade camber of at least one of the front propeller and the rear propeller is configured such that the front propeller absorbs more torque/thrust load than the rear propeller during said rotation of the front and rear propellers.

\* \* \* \* \*